W. H. Towers,
Hoop Skirt.
No. 4316 Reissued Mar. 28. 1871.
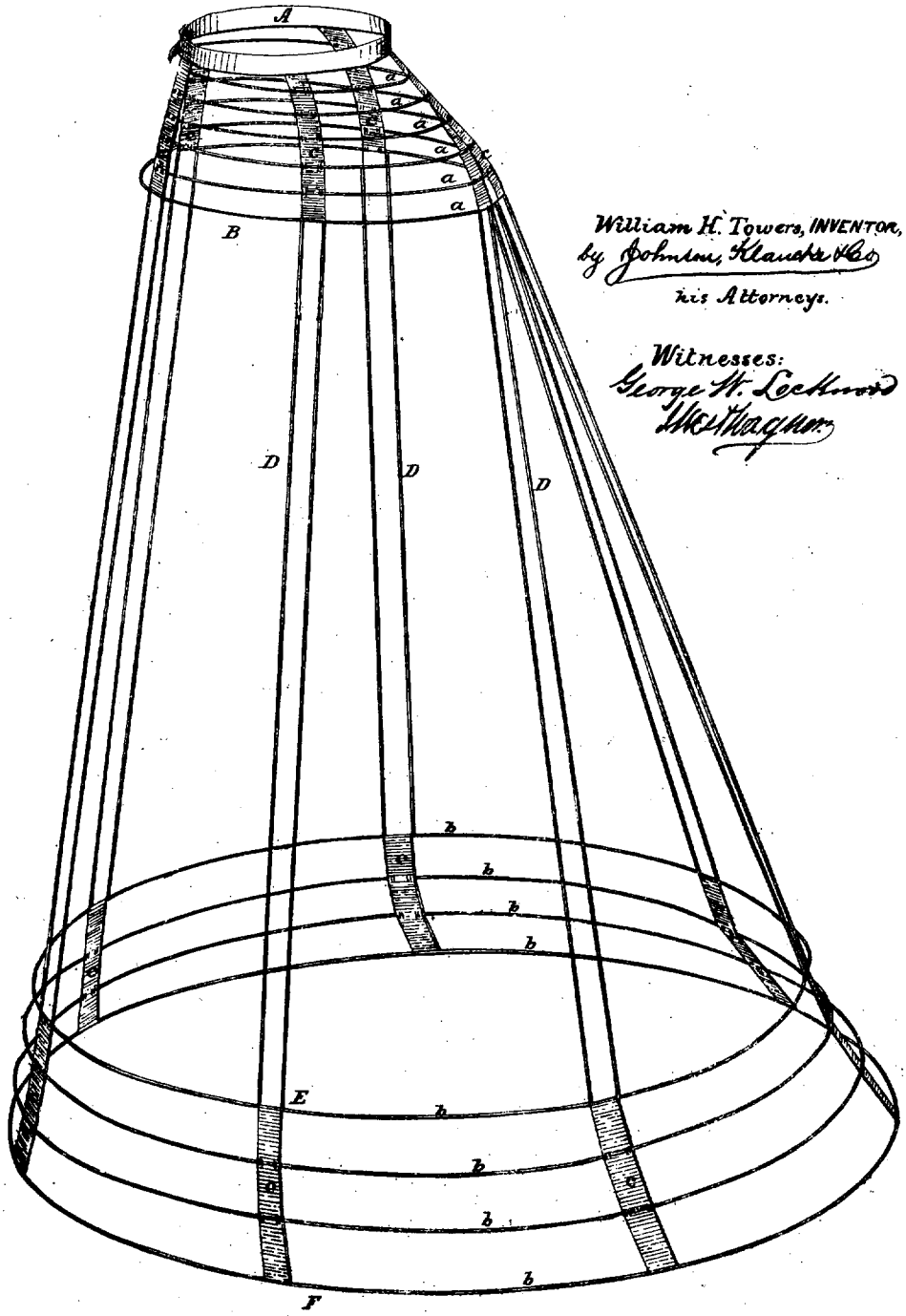
William H. Towers, INVENTOR,
by Johnson, Klauda & Co
his Attorneys.
Witnesses:
George H. Lockwood
W. E. Hagan

United States Patent Office.

WILLIAM H. TOWERS, OF BOSTON, MASSACHUSETTS, ASSIGNOR TO THE VERTICAL HOOP-SKIRT COMPANY, OF SAME PLACE.

Letters Patent No. 84,149, dated November 17, 1868; reissue No. 4,316, dated March 28, 1871.

IMPROVEMENT IN HOOP-SKIRTS.

The Schedule referred to in these Letters Patent and making part of the same.

*To all whom it may concern:*

Be it known that I, WILLIAM H. TOWERS, of Boston, in the county of Suffolk and State of Massachusetts, have invented a new and improved Hoop-Skirt; and I do hereby declare that the following is a full, clear, and exact description thereof, which will enable others skilled in the art to make and use my invention, reference being had to the accompanying drawing of the same, which makes part of this specification, and which represents my new and improved skeleton hoop-skirt.

My invention relates to improvements in skeleton hoop-skirts; and

The said invention consists in constructing the skirt of an upper and a lower nest or group of hoops with an intervening space, which nests or groups are suitably connected to each other, at the top and bottom of the skirt, by wires or other suitable means, in substitution of a large number of the hoops, which, by this improvement, may be omitted from a short distance below the waist or bustle of the wearer to the lower portion of the skirt, which, as used, is in contact with the wearer when sitting down, and which are objectionable both because of having to sit upon them and because, when so sat upon at the rear, tend to throw up the dress, which it is one of the principal objects of my invention to avoid.

The upper nest of hoops *a* forms the bustle from A to B, and the lower nest of hoops *b* the flounce portion of the skirt from E to F, and the number of hoops of each group and the means of connecting them together being optional with the manufacturer, the intervening space being formed by the omission of the hoops between the groups.

The material employed is the ordinary skirt-wire. The two groups are, in the example shown, connected together by suspension wires D, (or other means may be used for the purpose,) or both together, if desired, which are fastened to the bustle and to the flounce-hoops by any well-known means.

By this improvement it will be seen that it is only necessary to arrange the hoops or wires to form the upper or bustle portion of the skirt and the lower or flounce portion, and leave the intervening space comparatively open.

This construction of hoop-skirt possesses many advantages over those heretofore in use, among which is its lightness, by the omission of the body of the hoops, which omission is highly desirable; for, when they are used, the wearer cannot sit without sitting on the hoops, which are always uncomfortable and sometimes injurious.

Their use also exposes the knees to the liability of being cut or hurt by them, but by my improvement they are dispensed with both at the seat and the knees.

Another material advantage of this arrangement is that when the two groups are united by wires D, as shown, they serve as braces to hold the lower group down when the wearer sits; and, when kneeling, to force the front wires below the knees, so that they may not be injured by resting on wire strands, as they are liable to be with skirts in which the hoops occupy the body of the skirt. Moreover, the wire connections form braces to the lower group, to prevent its derangement by the wind, and especially to counteract the swinging tendency of the bottom of the dress caused by the horizontal oscillation of the body while walking. Another great advantage is that the separate groups admit of changes in the form of the bustle and flounce to suit the varying fashions, and greatly lessens the cost of the skirt.

The bustle and flounce hoops *a* and *b* are held together by tapes *c*, but wire may be used.

From the foregoing description it is obvious that the connecting wires or other means of connection may be varied in form and arrangement so long as the intervening space with separate groups of hoops is not essentially departed from in the construction of the skeleton-skirt.

Having described my invention,

I claim—

1. A skeleton hoop-skirt, consisting of an upper and a lower group of hoops with an intervening space, and suitably connected to each other, for accomplishing the purposes described.

2. In combination with the above, the suspending and bracing wires for holding down the flounce-group E F when the wearer sits, and counteracting horizontal oscillation thereof when walking, as described.

WM. H. TOWERS.

Witnesses:

O. GEO. DENVER,

G. E. SANGSTON.